US011130460B2

(12) United States Patent
Furumoto et al.

(10) Patent No.: US 11,130,460 B2
(45) Date of Patent: Sep. 28, 2021

(54) SENSOR PROTECTOR (71) Applicant: TOYOTA JIDOSHA KABUSHIKI KAISHA, Aichi (JP)

(72) Inventors: Kenji Furumoto, Toyota (JP); Takuto Kumashiro, Toyota (JP); Takashi Unno, Toyota (JP); Shinji Takeo, Seto (JP); Koji Takeuchi, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 178 days.

(21) Appl. No.: 16/517,676

(22) Filed: Jul. 22, 2019

(65) Prior Publication Data
US 2020/0101916 A1    Apr. 2, 2020

(30) Foreign Application Priority Data

Sep. 27, 2018    (JP) .............................. JP2018-182388

(51) Int. Cl.
*B60R 19/48* (2006.01)
*G01S 13/93* (2020.01)
*B60R 19/30* (2006.01)
*G01S 13/931* (2020.01)
*G01S 7/02* (2006.01)

(52) U.S. Cl.
CPC ............ *B60R 19/483* (2013.01); *B60R 19/30* (2013.01); *G01S 13/931* (2013.01); *G01S 7/027* (2021.05); *G01S 2013/93275* (2020.01)

(58) Field of Classification Search
CPC .................. B60R 19/483; B60R 19/30; B60R 2021/01345; G01S 2007/027; G01S 2013/93275
See application file for complete search history.

(56) References Cited

U.S. PATENT DOCUMENTS 10,160,292 B2 *   12/2018   Chin ........................ B60H 1/26
2019/0100162 A1    4/2019   Furumoto

FOREIGN PATENT DOCUMENTS

| JP | 2012-225731 A | 11/2012 |
| JP | 2012-225733 A | 11/2012 |
| JP | 2014-134414 A | 7/2014 |
| JP | 2015-212705 A | 11/2015 |
| JP | 2019-64417 A | 4/2019 |

* cited by examiner

*Primary Examiner* — D Glenn Dayoan
*Assistant Examiner* — Melissa Ann Bonifazi
(74) *Attorney, Agent, or Firm* — Hauptman Ham, LLP (57) ABSTRACT

A sensor protector includes two stays and a thin-plate shaped separate sheet held by the stays. The stays are provided on a bracket. The bracket holds a sensor and is fixed at a predetermined position to an outside panel of the body of a vehicle covered with a bumper cover of the vehicle. The sheet extends such that, in the sensor attached state, the sheet divides/partitions a space around the sensor formed between the outside panel of the body and the bumper cover into an upper space which contains the entirety of the detection surface of the sensor and a lower space which does not contain the detection surface of the sensor.

12 Claims, 9 Drawing Sheets

SENSOR PROTECTOR

RELATED APPLICATIONS

The present application claims priority to Japanese Patent Application No. 2018-182388, filed Sep. 27, 2018, the disclosure of which is hereby incorporated by reference herein in its entirety.

BACKGROUND OF THE INVENTION

Field of the Invention

The present invention relates to a sensor protector for protecting a sensor fixed to an outside panel of the body of a vehicle.

Figure 9:
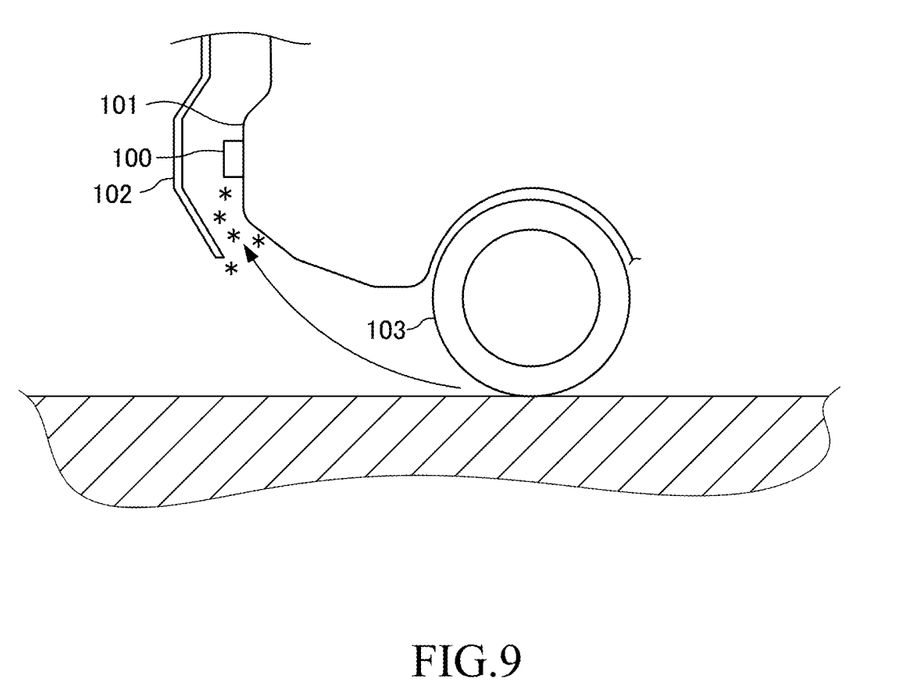
FIG. 9 is a view showing the conventionally employed positional relationship among a sensor, a bumper cover, and an outside panel of a body.

FIG. 9 shows a conventionally known sensor (for example, a radar sensor) 100 fixed to an outside panel (for example, a rear end panel) 101 of the body of a vehicle. The sensor 100 is covered with a bumper cover 102 so that the sensor 100 cannot be viewed from the outside of the vehicle. Further, cover members (not shown) for preventing erroneous detection are attached to the sensor 100. The cover members are curved plates. In a state in which the sensor is attached/fixed to the outside panel of the body, the cover members protrude toward the outside of the body from both side portions of the sensor in the width direction of the vehicle (see, for example, Japanese Patent Application Laid-Open (kokai) No. 2014-134414).

Hereinafter, the state in which the sensor is attached/fixed to the outside panel of the body will be simply referred to as the "sensor attached state."

However, since the lower end of the bumper cover 102 is apart (located away) from the outside panel 101 of the body, in the sensor attached state, the space below the sensor 100 communicates with the space outside the vehicle. Therefore, snow, mud, or the like may pass through the gap between the lower end of the bumper cover 102 and the outside panel 101 of the body, reach the sensor 100, and adhere to the detection surface of the sensor 100. The adhesion of snow, mud, or the like to the detection surface of the sensor 100 may adversely affect the performance of the sensor.

Meanwhile, Japanese Patent Application Laid-Open No. 2014-134414 discloses attaching cover members to the upper and lower sides of the sensor as well in the sensor attached state. However, Japanese Patent Application Laid-Open No. 2014-134414 does not disclose a specific way on how to attach the cover member to the sensor or on how to hold the cover member by the sensor.

SUMMARY OF THE INVENTION

The present invention has been accomplished so as to solve the above-described problem. Namely, one object of the present invention is to provide a sensor protector (hereinafter referred to as the "protector of the present invention") which can reduce the possibility of adhesion of snow, mud, or the like to the detection surface of a sensor disposed/arranged/fixed in a space between an outside panel of a vehicle body and a bumper cover, the sensor protector being simple in structure and inexpensive.

A protector of the present invention comprises:

a stay (30, 40) provided on a bracket (20) which holds a sensor (60) and is fixed at a predetermined position to an outside panel (101) of a body of a vehicle, the panel being covered with a bumper cover (102) of the vehicle, the stay being non-separable or separable from the bracket (the stay may be expressed as being integrated with the bracket or being separate from the bracket); and a thin-plate shaped sheet (50) which is separable (or separate) from the stay and is held by the stay.

In a sensor attached state which is a state in which the bracket has been fixed to the outside panel, the sheet extends in a front-back direction and a width direction of the body in an area below a detection surface (61) of the sensor so as to partition/divide a space (S) around the sensor formed between the outside panel of the body and the bumper cover into an upper space (Sup) which contains the entirety of the detection surface (61) of the sensor and a lower space (Slo) which does not contain the detection surface (61) of the sensor.

In this manner, the protector of the present invention includes the sheet and the stay provided on the bracket which holds the sensor. When the bracket is fixed to the outside panel of the body, the sensor is substantially fixed to the outside panel through the bracket.

The stay and the bracket may be formed integrally. In other words, the stay may be non-separable from the bracket. Alternatively, the stay may be a member different from the bracket (namely, separate/separable from the bracket) and supported by and fixed to the bracket.

The sheet is a thin-plate-shaped member and is separate from the stay. In the case where the sheet is held by the stay in the sensor attached state, the sheet extends in the front-back direction of the vehicle and the width direction of the vehicle in an area/region below the detection surface of the sensor in the "space around the sensor" formed between the outside panel of the body and the bumper cover. Accordingly, the sheet partitions (or divides) the "space around the sensor" formed between the outside panel of the body and the bumper cover into "the upper space which substantially contains the entirety of the detection surface of the sensor" and "the lower space which does not contain the detection surface of said sensor". The expression "substantially contains the entirety of the detection surface of the sensor" means to contain the entirety of a "part/portion of the surface of the sensor" which affects the detection accuracy of the sensor when something is adhered to the part. For example, in the case where the sensor is a radar sensor which will be described later, a transmission/reception surface which is the detection surface of the sensor. Accordingly, for example, a part/portion of a connector of the sensor may be contained in the lower space (because the part/portion of the connector does not affect the detection accuracy of the sensor when something is adhered to that part).

The sheet can substantially block "snow, mud, or the like" which passes through the opening formed between the outside panel of the body and the lower end of the bumper cover toward the detection surface of the sensor. Therefore, the protector of the present invention can reduce the possibility of adhesion of snow, mud, or the like to the detection surface of the sensor by its simple structure. Further, since the sheet has a thin-plate shape, it is easy to manufacture/form the outline shape. In addition, the sheet is held by the "stay which is a member different/separable from the sheet" and which is provided on the bracket. Therefore, it is possible to use the stay commonly among different vehicle models and manufacture the sheet to have a shape corresponding to the shape of the bumper cover of each vehicle model, so as to manufacture a sensor protector suitable for each vehicle model. Accordingly, the sensor protector can be provided more inexpensively as compared with the case where members corresponding to the stay and the sheet are manufactured integrally (non-separable from each other).

In one aspect/embodiment of the protector of the present invention, the stay includes a sheet holding part (33, 43) at a position of the stay located below a lower end part of the detection surface of the sensor in the sensor attached state, and the sheet holding part has an elastically deformable claw part (33C, 43C) and a slit (SL1, SL2) into which the sheet is inserted; and the sheet has a hole (51) with which the claw part can engage and is configured such that the sheet is held by the stay when the sheet is inserted into the slit and the claw part is engaged with the hole.

According to this aspect, the sheet can be held by the stay by merely inserting the sheet into the slit of the sheet holding part and bringing the claw part of the sheet holding part into engagement with the hole of the sheet. Therefore, the easiness of assembly of the sensor protector can be enhanced.

In another aspect/embodiment of the protector of the present invention, the sheet is formed from a plastic corrugated board, and the sheet has an outline shape which corresponds to a shape of an inner side surface of the bumper cover in plan view in the sensor attached state. More specifically, "an end part (sheet distal end part ST) of the sheet" opposite a part of the sheet (sheet proximal end part KT) held by the stay has a shape determined such that the end part extends along the inner wall surface of the bumper cover while being spaced a predetermined distance from the inner wall surface of the bumper cover.

The plastic corrugated board is light in weight, can maintain its shape by itself, and has sufficient rigidity and durability against snow, mud, and the like potentially flying toward the detection surface of the sensor. Further, the plastic corrugated board is a member whose outline shape can be formed easily through machining as compared with a solid sheet formed of, for example, resin or metal. Therefore, according to this aspect, a "sheet which is light in weight, has sufficient rigidity and durability, and has a shape corresponding to the shape of the bumper cover of each vehicle model" can be manufactured at low cost, whereby an inexpensive sensor protector can be provided.

In still another aspect/embodiment of the protector of the present invention, the sheet includes a pair of flat liner-sheets (L) facing each other and a plurality of straight juncture parts (FM) each of which joins the liner-sheets together and which extend parallel to one another, and is held by the stay such that, in the sensor attached state, the magnitude of an angle which is formed between a direction in which the juncture portions extend and an attachment surface part (B) of the outside panel of the body to which the bracket is fixed is 45° or less.

The plastic corrugated board has property/characteristic such that, when an external force is applied to the plastic corrugated board in a direction parallel to the planes thereof, the plastic corrugated board easily bends at/along one of the juncture portions. In this aspect, in the sensor attached state, the magnitude of the "angle between the extension direction of the juncture portions and the attachment surface part of the outside panel of said body to which the bracket is fixed" is 45° or less. Therefore, in the case where a light collision which applies a force to the bumper cover in the front-back direction of the vehicle occurs and the bumper cover moves and/or deforms toward the outside panel of the body, the sheet deforms such that it bends at one of the juncture portions. Accordingly, it is possible to prevent transmission of a large force from the bumper cover to the outside panel of the body through the sheet, thereby reducing the degree of damage of the outside panel of the body.

In still another aspect/embodiment of the protector of the present invention, the sheet has a straight crease line portion (52R, 52L) which extends, in the sensor attached state, in a direction having a component in a direction perpendicular to the attachment surface part of the outside panel of the body to which the bracket is fixed; and the slit of the sheet holding part has a bent part into which the crease line portion is inserted.

According to this aspect, the sheet has the crease line portion. Therefore, in the sensor attached state, the sheet has an increased rigidity sufficient for maintaining the shape of the sheet more reliably. Furthermore, the crease line portion of the sheet is inserted into a bent part of the slit. Therefore, as a result of the sheet being merely held by the sheet holding part, the shape of the sheet bent at the crease line portion can be simply maintained. Thus, a sensor protector whose sheet hardly deforms over a long period of time is provided.

Notably, in the case where the sensor is a radar sensor which radiates and receives radio waves, a part of the sheet which is located on the side opposite the sensor with respect to the crease line portion may slope such that its position changes downward with increasing distance from the sensor in the sensor attached state. Namely, the sheet may have a sloping portion in the sensor attached state. Further, in the case where the sensor is the radar sensor, the sheet may slope such that its position changes downward with increasing distance from the sensor "in the direction perpendicular to the radio wave transmission/reception surface of the sensor."

By virtue of these features, the sheet slopes such that its position changes downward with increasing distance from the sensor. Therefore, the sheet does not hinder radiation of radio waves from the sensor and reception of radio waves (reflection waves) by the sensor.

In the above description, in order to facilitate understanding of the present invention, the constituent elements of the invention corresponding to those of embodiment of the invention which will be described later are accompanied by parenthesized names and/or symbols which are used in the embodiment; however, the constituent elements of the invention are not limited to those in the embodiment defined by the names and/or the symbols. Other objects, other features, and attendant advantages of the present invention will be readily appreciated from the following description of the embodiment of the invention which is made with reference to the accompanying drawings.

DESCRIPTION OF THE PREFERRED EMBODIMENT

Figure 1:
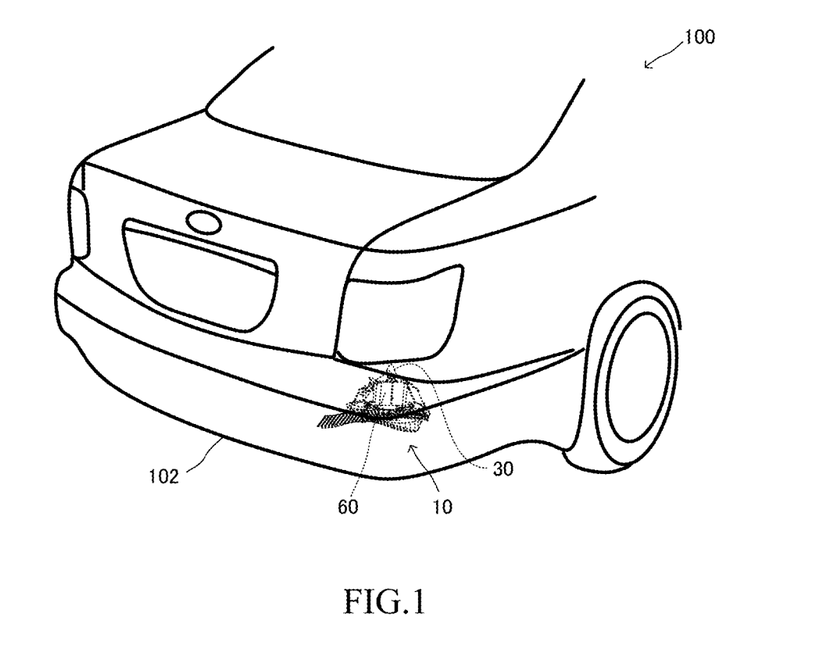
FIG. 1 is a view showing a part/portion of a vehicle to which a sensor protector according to an embodiment of the present invention is attached.

As shown in FIG. 1, a sensor protector 10 according to one embodiment of the present invention is mounted on a vehicle (automobile) 100. Hereinafter, the sensor protector 10 may be simply referred to as the "protector 10" or a "protection fitting/member 10" in some cases. The protector 10 also serves as a sensor attachment fitting/member for fixing the sensor 60 to the vehicle 100.

Figure 2:
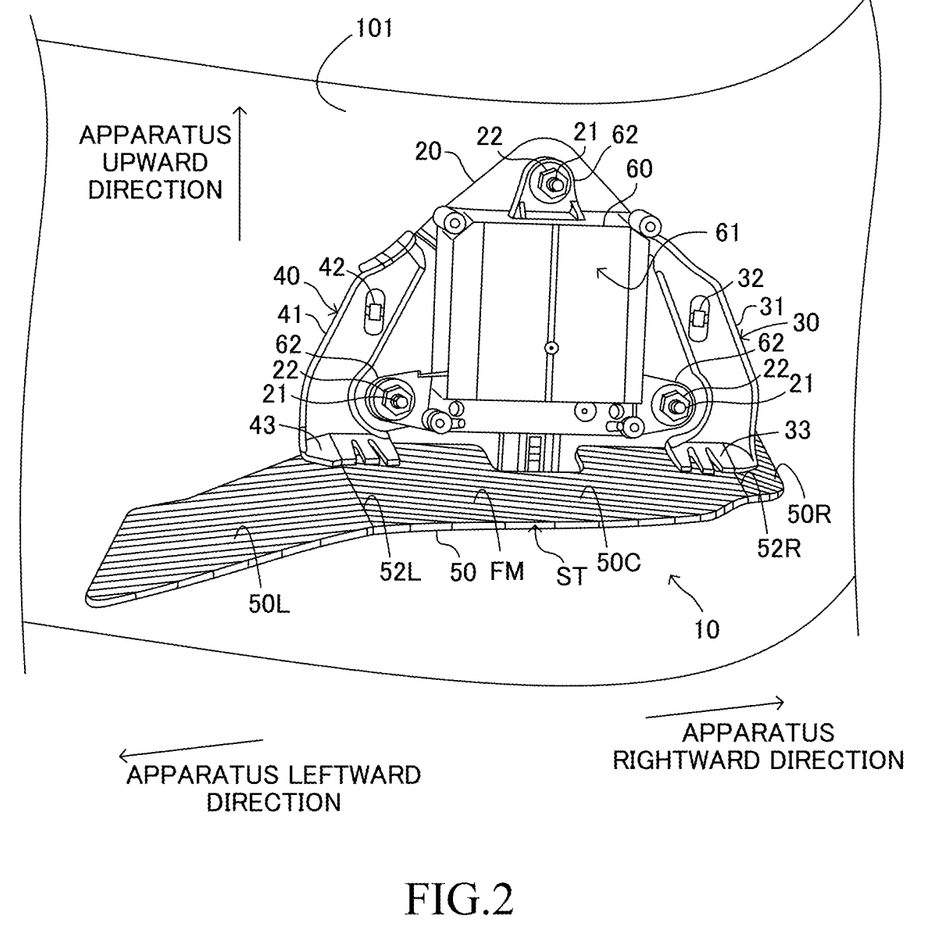
FIG. 2 is a perspective view of the protector shown in FIG. 1.

As shown in FIG. 2, the protector 10 has a "structure for protecting the sensor 60 from snow, mud, or the like" which will be described later. The sensor 60 radiates a radio wave in the millimeter wave band and receives a reflection wave which a target (target object) produces/generates by reflecting the radiated radio wave. The sensor 60 is a radar sensor which detects the target (the distance to the target, the direction of the target, the relative speed of the target, etc.) by using the radiated radio wave and the received reflection wave. The sensor 60 has a housing in the shape of an approximately rectangular parallelepiped. The shape of the sensor 60 in front view is approximately square. The approximately square front surface of the sensor 60 serves as a transmission/reception surface 61 for transmitting and receiving radio waves. The transmission/reception surface 61, which affects the detection accuracy of the sensor 60, will also be referred to as the "detection surface 61."

The protector 10 includes a bracket 20, a right stay 30, a left stay 40, and a sheet 50.

Figure 3:
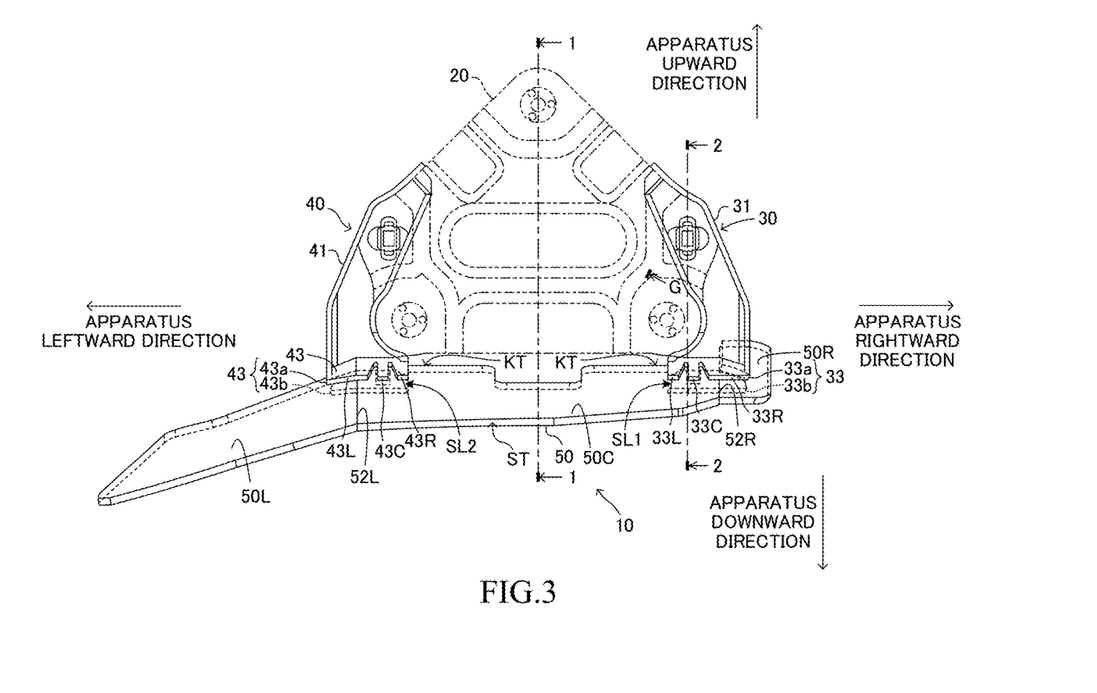
FIG. 3 is a front view of the protector shown in FIG. 1.
Figure 4:
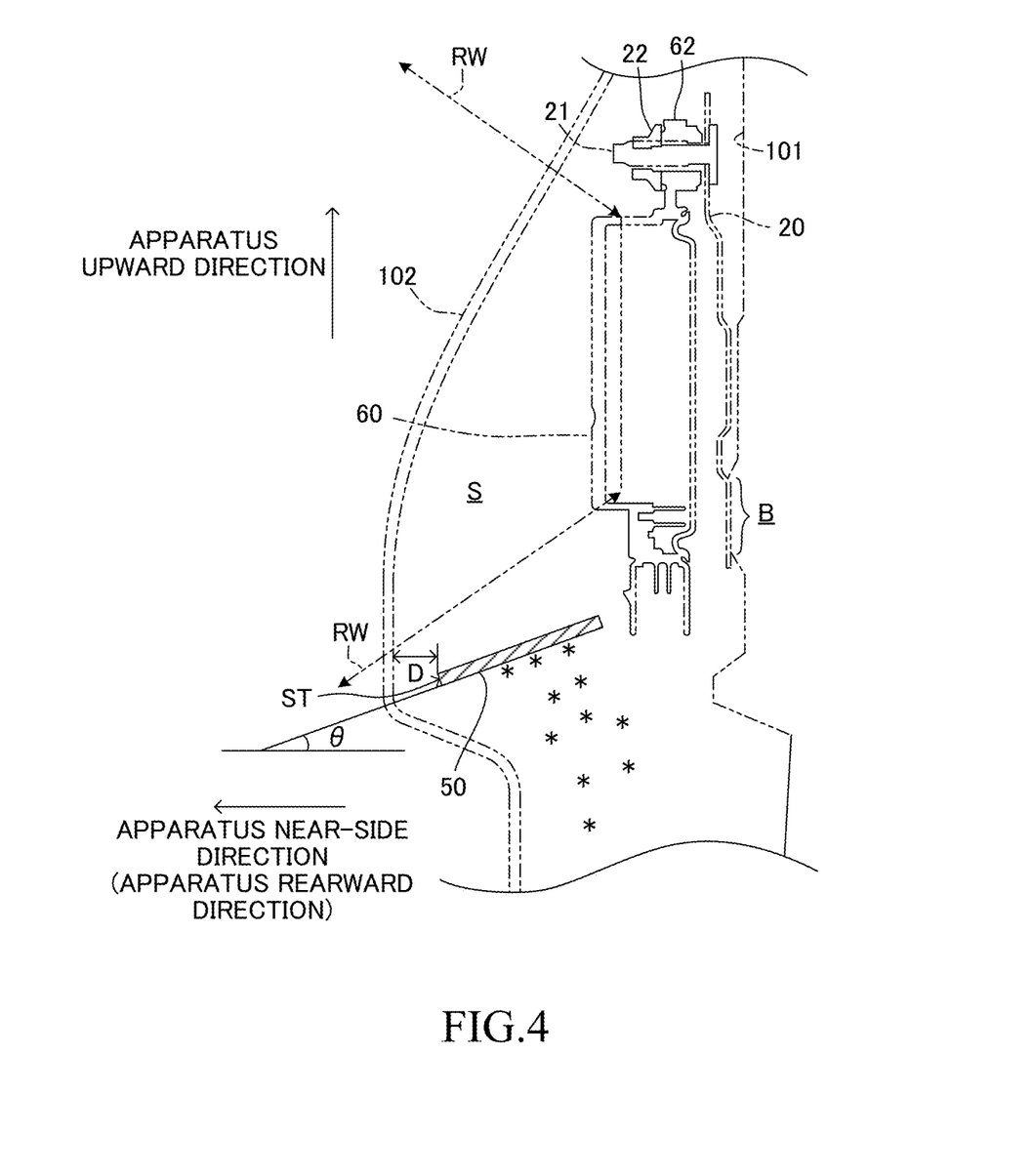
FIG. 4 is a sectional view of the protector according to the embodiment of the present invention which is obtained by cutting the protector by a plane along line 1-1 of FIG. 3.

As shown in FIG. 2 to FIG. 4, the bracket 20 is a plate-shaped member formed of a metal (iron in the present example). The shape of the bracket 20 in front view is approximately pentagonal. The bracket 20 has three bolts 21. The bolts 21 are fixed to the bracket 20 such that the bolts 21 protrude from the bracket 20. The bolts 21 are respectively disposed in the vicinity of the three apexes of an approximately regular triangle.

The sensor 60 has three attachment portions 62 extending from side surfaces of the housing of the sensor 60. A bolt hole is formed in each of the attachment portions 62. The bolt holes of the attachment portions 62 are arranged at positions corresponding to the bolts 21, respectively.

As shown in FIG. 2 and FIG. 4, the bolts 21 are inserted into the bolt holes of the attachment portions 62 and are brought into screw engagement with nuts 22. The sensor 60 is fixed to (held by) the bracket 20 as a result of the nuts 22 being tightened.

As shown in FIG. 4, a portion B of the back surface of the bracket 20 is fixed, by means of welding, to an attachment surface part of the back panel 101, which portion is located in the vicinity of a right corner of the back panel 101. The back panel 101 is a part of a rear outside panel of the body of the vehicle 100. The attachment surface part is approximately flat. When the bracket 20 is fixed to the attachment surface part, the sensor 60 is fixed to (held by) the back panel 101 through the bracket 20. In this state, the transmission/reception surface 61 of the sensor 60 becomes parallel to the attachment surface part.

In the following description, the direction toward the vertically upper side of the sensor 60 and the bracket 20 in the sensor attached state (namely, a state in which the bracket 20 holding the sensor 60 is fixed to the back panel 101) will be referred to as the "apparatus upward direction," and the direction toward the vertically lower side of the sensor 60 and the bracket 20 in the sensor attached state will be referred to as the "apparatus downward direction." In addition, a horizontal direction which is perpendicular to the apparatus upward direction and is along the "transmission/reception surface 61 of the sensor 60 (and the attachment surface part to which the portion B of the back surface of the bracket 20 is fixed)" in the sensor attached state will be referred to as the "apparatus lateral direction." Namely, the leftward direction in the sheet of FIG. 3 is the "apparatus leftward direction," and the rightward direction in the sheet of FIG. 3 is the "apparatus rightward direction." Furthermore, a direction which is perpendicular to the apparatus upward direction and is directed from the bracket 20 toward the sensor 60 in the sensor attached state (direction perpendicular to the sheet of FIG. 3) will be referred to as the "apparatus near-side direction" or the "apparatus rearward direction."

As can be understood from FIG. 1, FIG. 4, etc., in the sensor attached state, the sensor 60 is covered with (hidden by) a bumper cover 102. In other words, the sensor 60 is disposed/positioned in a space S formed between the back panel 101 and the bumper cover 102. Accordingly, the sensor 60 transmits and receives radio waves through the bumper cover 102. A lower end part of the bumper cover 102 is located away (or apart) from the back panel 101. In other words, an opening is provided/formed between the lower end part of the bumper cover 102 and the back panel 101.

The right stay 30 shown in FIG. 2, FIG. 3, FIG. 5A and FIG. 5B is a member formed of resin (polyacetal (POM) in the present example). However, the right stay 30 may be formed of other types of resins such as polybutylene terephthalate (PBT). The right stay 30 has an arm part/portion 31, a clip part/portion 32, and a sheet holding part/portion 33.

Figure 5A:
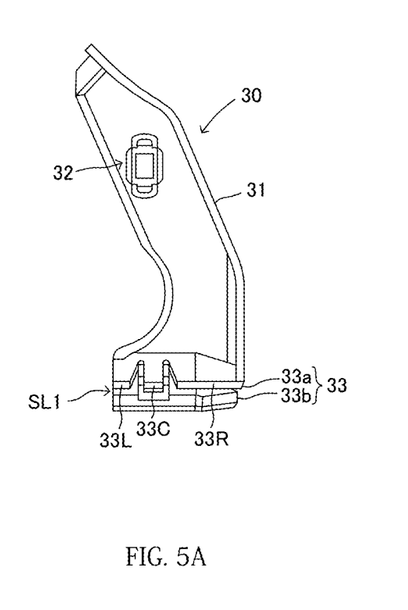
FIG. 5A is a front view of the right arm shown in FIG. 2
Figure 5B:
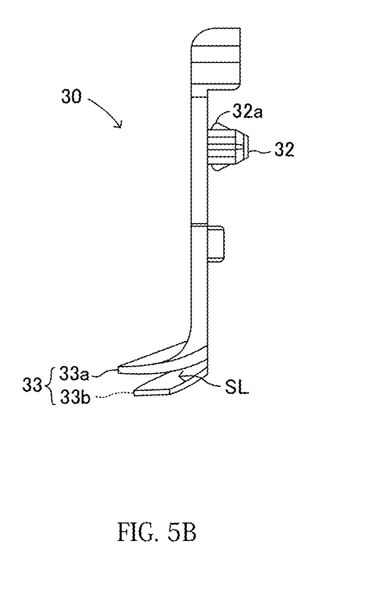
FIG. 5B is a side view of the right arm.

The arm part 31, which is plate-shaped, has a generally strip-like, arcuate shape in its front view. As will be described later in detail, the arm part 31 is supported by the bracket 20 through the clip part 32. The arm part 31 extends in the apparatus vertical direction in the sensor attached state. The lower end of the arm part 31 is located at a position in the apparatus downward direction (on the lower side) with respect to the lower end of the transmission/reception surface 61 of the sensor 60.

Figure 6:
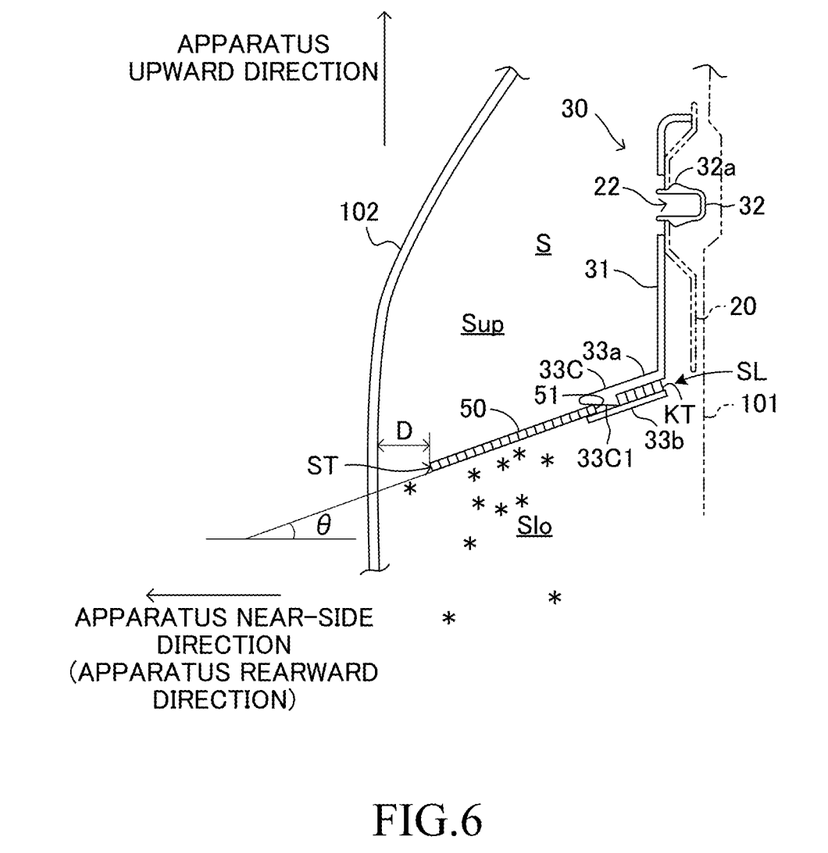
FIG. 6 is a sectional view of the protector according to the embodiment of the present invention which is obtained by cutting the protector by a plane along line 2-2 of FIG. 3.

The clip part 32 is formed in an area/portion of the arm part 31 located slightly above the vertically center position of the arm part 31. As shown in FIG. 5B and FIG. 6, the clip part 32 is formed/configured so as to protrude from the arm part 31 toward the bracket 20. The clip part 32 has a pair of protrusions 32a which protrude upward and downward, respectively. The clip part 32 is formed/configured to be elastically deformable in the radial direction.

As shown in FIG. 6, the clip part 32 is inserted into an attachment hole 22 formed in the bracket 20. When the clip part 32 is inserted into the attachment hole 22 while being elastically deformed, the protrusions 32a engage with the edge of the attachment hole 22. As a result, the right stay 30 is held by (fixed to) the bracket 20.

The sheet holding part/portion (sheet attachment aprt/portion) 33 is a part/portion which is bent at the lower end of the arm part 31 and extends in a direction away from the bracket 20 (namely, the apparatus near-side direction) in the sensor attached state. As shown in FIG. 5A and FIG. 5B, the sheet holding part 33 includes an upper holding part/portion 33a and a lower holding part/portion 33b. The upper holding part 33a and the lower holding part 33b are plate-shaped parts extending in the apparatus lateral direction in the sensor attached state. The upper holding part 33a and the lower holding part 33b face each other with a predetermined spacing therebetween, so that a slit SL1 is formed between the upper holding part 33a and the lower holding part 33b. The width of the slit SL1 is substantially the same as the thickness of the sheet 50.

Two cutouts are formed in the upper holding part 33a. As a result, a left distal end part/portion 33L, a center distal end part/portion 33C, and a right distal end part/portion 33R are formed on the distal end side (an end part located in the apparatus near-side direction) of the upper holding part 33a. Thus, the center distal end part 33C is elastically deformable in the vertical direction. As shown in FIG. 6, a claw 33C1 protruding downward is formed on the lower side of a distal end part of the center distal end part 33C. In other words, the center distal end part 33C constitutes a claw part/portion 33C.

In front view, each of the "right distal end part 33R" and a "part of the lower holding part 33b facing the right distal end part 33R" has a part/portion extending in the apparatus lateral direction (part/portion located adjacent to the center distal end part 33C) and a sloping part/portion which slopes, from the part extending in the apparatus lateral direction, slightly downward and toward the apparatus rightward direction. In other words, the "right distal end part 33R" and the "part of the lower holding part 33b facing the right distal end part 33R" form a bent part/portion.

The left stay 40 is formed of the same material as the right stay 30 and includes an arm part 41, a clip part/portion 42, and a sheet holding part/portion 43. The shape of the left stay 40 is a mirror image of the shape of the right stay 30.

Namely, the arm part 41, which is plate-shaped, has a generally strip-like, arcuate shape in its front view. Similarly to the arm part 31, the arm part 41 is supported by the bracket 20 through the clip part 42. The arm part 41 extends in the apparatus vertical direction in the sensor attached state. The lower end of the arm part 41 is located below the lower end of the transmission/reception surface 61 of the sensor 60.

The clip part 42 is formed in a part/portion of the arm part 41 located slightly above the vertically center position of the arm part 41. The shape of the clip part 42 is identical with the shape of the clip part 32. Therefore, "unillustrated protrusions identical with the protrusions 32a" are formed on the clip part 42. When the clip part 42 is inserted into an "attachment hole which is formed in the bracket 20 and is identical with the attachment hole 22" while being elastically deformed, the protrusions engage with the edge of the attachment hole. As a result, the right stay 40 is held by (fixed to) the bracket 20.

Similarly to the sheet holding part 33, the sheet holding part (sheet attachment part/portion) 43 is a part/portion which is bent at the lower end of the arm part 41 and extends in a direction away from the bracket 20 (namely, the apparatus near-side direction) in the sensor attached state. As shown in FIG. 3, the sheet holding part 43 includes an upper holding part/portion 43a and a lower holding part/portion 43b. The upper holding part 43a and the lower holding part 43b are plate-shaped parts/portions extending in the apparatus lateral direction in the sensor attached state. The upper holding part 43a and the lower holding part 43b face each other with a predetermined spacing therebetween, so that a slit SL2 is formed between the upper holding part 43a and the lower holding part 43b. The width of the slit SL2 is substantially the same as the thickness of the sheet 50.

Two cutouts are formed in the upper holding part 43a. As a result, a left distal end part 43L, a center distal end part 43C, and a right distal end part 43R are formed on the distal end side of the upper holding part 43a. Thus, the center distal end part 43C is elastically deformable in the vertical direction. A "claw which is identical with the claw 33C1 and protrudes downward" is formed on the lower side of a distal end part of the center distal end part 43C. In other words, the center distal end part 43C constitutes a claw part 43C.

Each of the "left distal end part 43L" and a "part/portion of the lower holding part 43b facing the left distal end part 43L" has, in front view, a part/portion extending in the apparatus lateral direction (part/portion located adjacent to the center distal end part 43C) and a sloping part/portion which slopes, from the part/portion extending in the apparatus lateral direction, slightly downward and toward the apparatus leftward direction. In other words, the "left distal end part 43L" and the "part/portion of the lower holding part 43b facing the left distal end part 43L" form a bent part/portion.

Figure 7:
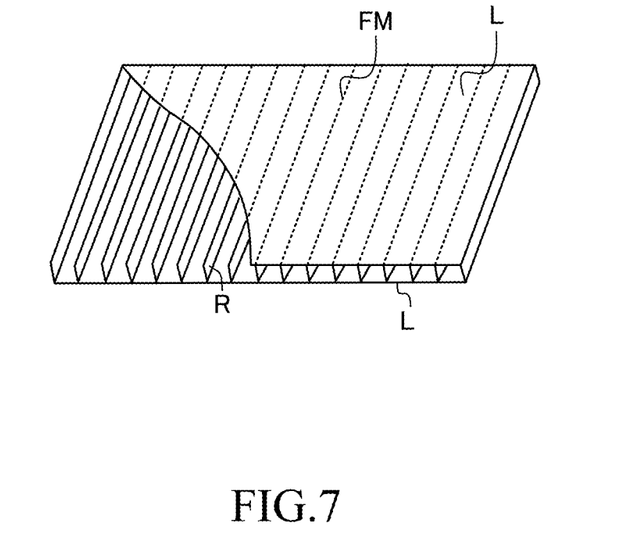
FIG. 7 is a perspective view of a plastic corrugated board used to form a sheet shown in FIG. 2.

The sheet 50 is a plate-shaped member (sheet-shaped member) formed from a "plastic corrugated board made of synthetic resin" shown in FIG. 7. As shown in FIG. 2 and FIG. 3, the sheet 50 is inserted into the slit SL1 of the sheet holding part 33 and the slit SL2 of the sheet holding part 43, whereby the sheet 50 is supported (held) by the sheet holding part 33 and the sheet holding part 43. The sheet 50 is manufactured through punching.

More specifically, the sheet 50 has a through hole 51 with which the claw 33C1 of the claw part 33C engages as shown in FIG. 6 when the sheet 50 is inserted into the slit SL1 and the slit SL2. Further, the sheet 50 has an unillustrated through hole with which the claw of the claw part 43C engages when the sheet 50 is inserted into the slit SL1 and the slit SL2. The sheet 50 is inserted into the slit SL1 and the slit SL2 in such a manner that the claw 33C1 engages with the through hole 51 and the claw of the claw part 43C engages with the unillustrated through hole, so as to be held by the sheet holding part 33 and the sheet holding part 43.

Hereinafter, an "end part of the sheet 50" held by the sheet holding part 33 and the sheet holding part 43 will also be referred to as the "sheet proximal/base end part (KT)." An end part of the sheet 50 on the side opposite the proximal end part of the sheet 50 (namely, located in the apparatus near-side direction) (an end part of the sheet 50 which is more remote from the bracket 20 than the proximal end part (KT)) will also be referred to as the "sheet distal end part (ST)." Further, the state in which the sheet 50 is held by the sheet holding part 33 and the sheet holding part 43 in the sensor attached state" will also be referred to as the "sheet installed/attached state."

In the sheet installed state, the sheet 50 extends from the sheet proximal end part (KT) toward the bumper cover 102 and substantially in the apparatus lateral direction. As shown in FIG. 4 and FIG. 6, in the sheet installed state, the sheet 50 has an attitude such that the sheet distal end part (ST) is located below the sheet proximal end part (KT). Namely, the sheet 50 is held such that the sheet 50 slopes in the apparatus near-side direction at a first predetermined angle $\theta$ (for example, 20°) with respect to the horizontal direction. Accordingly, the sheet 50 extends in the front-rear direction and the width direction of the body in a region below the detection surface 61 of the sensor 60.

As shown in FIG. 4 and FIG. 6, the sheet 50 has a shape determined such that, in the sheet installed state, the sheet distal end part (ST) faces the bumper cover 102 (the inner wall on the back side of the bumper cover 102) with a predetermined distance (spacing) D therebetween. In other words, the sheet distal end part (ST) has an outline shape determined such that the outline of the sheet distal end part (ST) extends along the inner wall of the bumper cover 102 in the sheet installed state. Notably, the predetermined distance D may or may not be constant and is, for example, about 1 cm to 3 cm.

Accordingly, the sheet 50 divides/partitions the "space S around the sensor 60" formed/located between the bumper cover 102 and the back panel 101 which is one outside panel of the body into an upper space Sup and a lower space Slo. The upper space Sup substantially contains the entirety (a whole) of the detection surface (the transmission/reception surface 61) of the sensor 60. The lower space Slo does not substantially contain the detection surface of the sensor 60. In other words, the sheet 50 covers the sensor 60 (the detection surface of the sensor 60) when the sensor 60 is viewed from the lower side of the vehicle 100.

In addition, as shown in FIG. 2 and FIG. 3, the sheet 50 has a right-hand crease line part/portion 52R and a left-hand crease line part/portion 52L. A part/portion of the sheet 50 between the "right-hand crease line part 52R and the left-hand crease line part 52L" is a sheet center part/portion 50C. A part/portion of the sheet 50 located in the apparatus rightward direction with respect to the "right-hand crease line part 52R" is a right sloping part/portion 50R. A part/portion of the sheet 50 located in the apparatus leftward direction with respect to the "left-hand crease line part 52L" is a left sloping part/portion 50L.

As shown in FIG. 2 and FIG. 3, the right-hand crease line part 52R extends straight in the apparatus near-side direction from the proximal end part (KT) to the distal end part (ST) of the sheet 50 inserted into the bent part of the sheet holding part 33 (the bent part formed by the right distal end part 33R and the lower holding part 33b). Notably, no limitation is imposed on the direction of the right-hand crease line part 52R so long as the direction of the right-hand crease line part 52R contains a component in the direction perpendicular to the attachment surface part of the back panel 101 to which the bracket 20 is attached. The left-hand crease line part 52L extends straight in the apparatus near-side direction from the proximal end part (KT) to the distal end part (ST) of the sheet 50 inserted into the bent part of the sheet holding part 43 (the bent part formed by the left distal end part 43L and the lower holding part 43b). Notably, no limitation is imposed on the direction of the left-hand crease line part 52L so long as the direction of the left-hand crease line part 52L contains a component in the direction perpendicular to the attachment surface part of the back panel 101 to which the bracket 20 is attached.

The right sloping part 50R slopes in the apparatus downward direction while extending in the apparatus rightward direction. In the sheet installed state, the right sloping part 50R slopes at a second predetermined angle (for example, 20°) with respect to the horizontal direction.

The left sloping part 50L slopes in the apparatus downward direction while extending in the apparatus leftward direction. In the sheet installed state, the left sloping part 50L slopes at a third predetermined angle (for example, 20°) with respect to the horizontal direction. The length of the left sloping part 50L in the apparatus lateral direction is longer than that of the right sloping part 50R. However, an end part of the left sloping part 50L located in the apparatus leftward direction (namely, an end part of the sheet 50 on the left side in the apparatus lateral direction) is located in the side toward the right side of the body with respect to a center portion of the bumper cover 102 in the width direction of the vehicle.

As described above, each of the sheet center part 50C, the right sloping part 50R, and the left sloping part 50L slopes in the apparatus near-side direction at the first predetermined angle θ (for example, 20°) with respect to the horizontal direction.

As shown in FIG. 7, the plastic corrugated board used to form the sheet 50 has two thin-plate-shaped liners (flat sheets or flat liner-sheets) L disposed parallel to each other with a gap formed therebetween, and a plurality of ribs R which join (connect) the two liners L. The ribs R are straight and extend parallel to one another. The parts/portions where the ribs R are formed will also be referred to as juncture parts/portions FM. The plastic corrugated board has property/characteristic such that, when an external force is applied to the plastic corrugated board in a direction parallel to the planes formed by the liners L, the plastic corrugated board easily bends at/along one of the juncture parts/portions FM.

As can be understood from FIG. 2, the juncture parts FM of the sheet 50 extend approximately parallel to the attachment surface part (accordingly, the transmission/reception surface 61). The expression "approximately parallel" is not limited to the case where the juncture parts FM of the sheet 50 are exactly parallel to the attachment surface part, but means that the magnitude of the angle between the attachment surface part and the extension direction of the juncture parts FM is 45° or smaller.

In the protector 10 configured as described above, the sheet 50 substantially divides/partitions the space S around the sensor 60 into the upper space Sup which substantially contains the entirety of the detection surface (the transmission/reception surface 61) of the sensor 60 and the lower space Slo which does not substantially contain the detection surface of the sensor 60.

Accordingly, the sheet 50 can substantially block "snow, mud, or the like" which passes through the opening formed between the back panel 101 and the lower end of the bumper cover 102 toward the detection surface of the sensor 60. Therefore, the protector 10 can reduce the possibility of adhesion of snow, mud, or the like to the detection surface of the sensor 60 by its simple structure.

Since the sheet 50 has a thin-plate shape, formation of the outline shape through machining is easy. In addition, the sheet 50 is held by the "stays 30 and 40 which are members different and separated/independent from the sheet 50" and which are provided on the bracket 20. Therefore, it is possible to use the stays 30 and 40 commonly among different vehicle models and manufacture the sheet 50 to have a shape corresponding to the shape of the bumper cover 102 of each vehicle model. As a result, the protector 10 can be provided more inexpensively as compared with the case where members corresponding to the stays 30 and 40 and the sheet 50 are manufactured integrally.

The stays 30 and 40 have, at respective portions thereof located below the lower end part of the detection surface (the transmission/reception surface 61) of the sensor 60 in the sensor attached state, the sheet holding parts 33 and 43 having the elastically deformable claw parts 33C and 43C and the slits SL1 and SL2 into which the sheet 50 is to be inserted. Thus, the sheet 50 can be held by the stays 30 and 40 by merely inserting the sheet 50 into the slit SL1 and the slit SL2 of the sheet holding parts 33 and 43 and bringing the claw parts 33C and 43C of the sheet holding parts into engagement with the holes 51 of the sheet 50. Since the sheet 50 can be simply held by the stays 30 and 40, the easiness of assembly (easiness of manufacture) of the protector 10 can be enhanced.

The sheet 50 is formed from a "plastic corrugated board" which is light in weight and can maintain its shape by itself, which has sufficient rigidity and durability against snow, mud, and the like potentially flying toward the sensor, and which is relatively inexpensive. Accordingly, a sheet having a shape corresponding to the shape of the bumper cover of each vehicle model can be manufactured at lower cost as compared with the case where a solid sheet formed of resin, metal, or the like is used.

Figure 8:
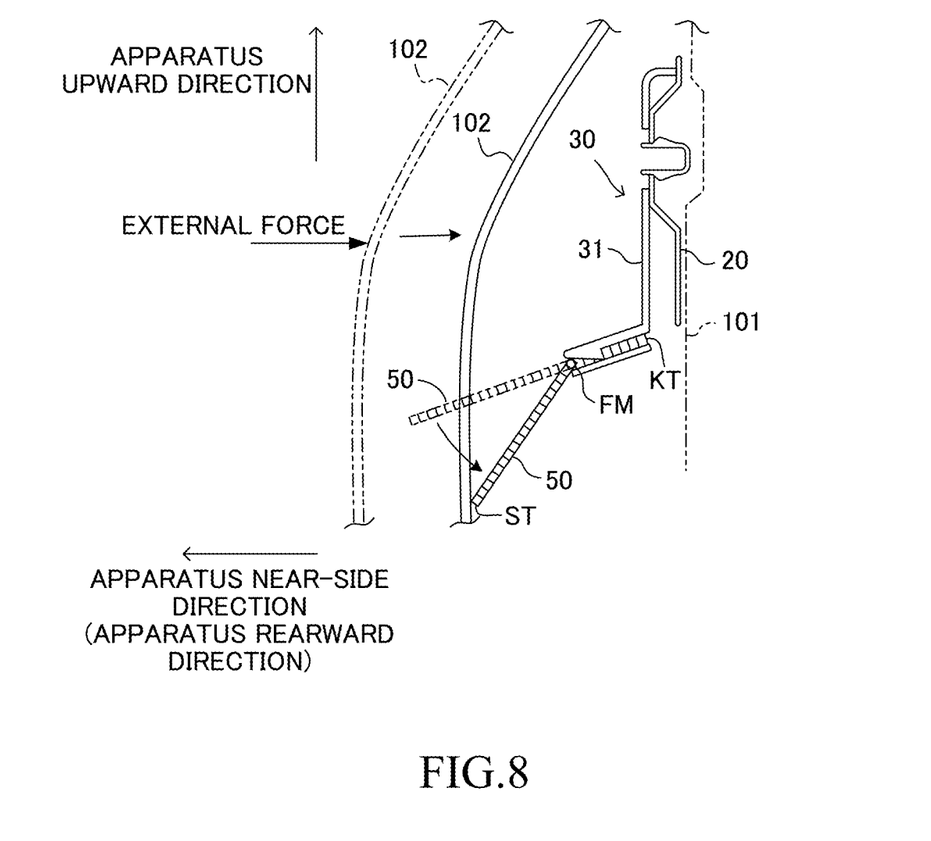
FIG. 8 is a view showing the state of the sheet when a bumper cover has deformed.

In the sensor attached state, the juncture parts FM of the sheet 50 extend approximately parallel to the attachment surface part (accordingly, the transmission/reception surface 61). Accordingly, as shown in FIG. 8, in the case where a light collision applies an external force to the bumper cover 102 in the front-back direction of the vehicle and the bumper cover 102 moves (deforms) toward the back panel 101, the sheet 50 deforms such that it bends at one of the juncture parts FM. As a result, it is possible to prevent transmission of a large force from the bumper cover 102 to the back panel 101 (the outside panel of the body) through the sheet 50, thereby reducing the degree of damage of the outside panel of the body.

The sheet 50 has crease line parts/portions (the right-hand crease line part 52R and the left-hand crease line part 52L). Therefore, in the sensor attached state, the sheet 50 has an increased rigidity sufficient for maintaining the shape of the sheet 50 more reliably. The crease line parts/portions of the sheet 50 are inserted into the bent parts of the slits (SL1 and SL2) (the bent part of the sheet holding part 33 and the bent part of the sheet holding part 43). Therefore, merely holding the sheet 50 with/using the sheet holding parts 33 and 43 can maintain the sheet 50 at bent shape (or bent) at the crease line portions 52R and 52L. Consequently, the protector 10 whose sheet 50 hardly deforms over a long period of time is provided.

In the sensor attached state, parts/portions of the sheet 50 each of which is located on the side opposite the sensor 60 with respect to the corresponding crease line portion (52R, 52L) (namely, the left sloping part 50L and the right sloping part 50R) slope such that their positions change downward with increasing distance from the sensor 60. In addition, the sheet 50 slopes such that, in the sensor attached state, its position changes downward with increasing distance from the sensor 60 in the direction perpendicular to the "radio wave transmission/reception surface (the apparatus near-side direction)."

By virtue of these features described above, the sheet 50 does not block radio waves radiated from the radio wave transmission/reception surface 61 of the sensor 60 and radio waves (reflection waves) to be received through the radio wave transmission/reception surface 61 (see radio wave boundary lines RW of FIG. 4).

As described above, the protector 10 yields various effects. Notably, the present invention is not limited to the above-described embodiment, and various modifications can be employed within the scope of the present invention.

In the above-described embodiment, the protector 10 is disposed at the rear right corner of the vehicle 100. However, in actuality, a "protector whose structure is a mirror image of the structure of the protector 10" and which holds another sensor 60 is disposed at the rear left corner of the vehicle 100. Further, the protector of the present invention may be disposed at a center portion of the rear end of the vehicle 100.

A sensor similar to the sensor 60 and a protector similar to the protector 10 may be disposed at the front right corner of the vehicle 100, the front left corner of the vehicle 100, or a center portion of the front end of the vehicle 100 such that the sensor and the protector are located between a front bumper cover and the outside panel of the body.

The stays (the right stay 30 and the left stay 40) are provided separately from the bracket 20 and are held by the bracket 20. However, those stays may be integrated with the bracket 20. The stays (the right stay 30 and the left stay 40) may be formed of a material other than resin (for example, metal).

The sheet 50 may be a solid thin plate formed of, for example, metal or resin. The sensor 60 is not limited to a radar sensor so long as the sensor has a detection surface.

What is claimed is:

1. A sensor protector, comprising:
a stay provided on a bracket which holds a sensor and is fixed at a predetermined position to an outside panel of a body of a vehicle, said panel being covered with a bumper cover of said vehicle, said stay being non-separable or separable from said bracket; and
a thin-plate shaped sheet which is separable from said stay and is held by said stay, wherein
in a sensor attached state which is a state in which said bracket has been fixed to said outside panel, said sheet extends in a front-back direction and a width direction of said body in an area below a detection surface of said sensor so as to partition a space around said sensor formed between said outside panel of said body and said bumper cover into an upper space which contains the entirety of said detection surface of said sensor and a lower space which does not contain said detection surface of said sensor;
said stay includes a sheet holding part at a position of said stay located below a lower end part of the detection surface of said sensor in said sensor attached state, and said sheet holding part has an elastically deformable claw part and a slit into which said sheet is inserted; and
said sheet has a hole with which said claw part can engage and is configured such that said sheet is held by said stay when said sheet is inserted into said slit and said claw part is engaged with said hole.

2. A sensor protector, comprising:
a stay provided on a bracket which holds a sensor and is fixed at a predetermined position to an outside panel of a body of a vehicle, said panel being covered with a bumper cover of said vehicle, said stay being non-separable or separable from said bracket; and
a thin-plate shaped sheet which is separable from said stay and is held by said stay, wherein
in a sensor attached state which is a state in which said bracket has been fixed to said outside panel, said sheet extends in a front-back direction and a width direction of said body in an area below a detection surface of said sensor so as to partition a space around said sensor formed between said outside panel of said body and said bumper cover into an upper space which contains the entirety of said detection surface of said sensor and a lower space which does not contain said detection surface of said sensor; and
said sheet is formed from a plastic corrugated board, and said sheet has an outline shape which corresponds to a shape of an inner side surface of said bumper cover in plan view in said sensor attached state.

3. A sensor protector according to claim 1, wherein said sheet is formed from a plastic corrugated board, and said sheet has an outline shape which corresponds to a shape of an inner side surface of said bumper cover in plan view in said sensor attached state.

4. A sensor protector according to claim 2, wherein said sheet includes a pair of flat liner-sheets facing each other and a plurality of straight juncture parts each of which joins said liner-sheets together and which extend parallel to one another, and is held by said stay such that, in said sensor attached state, the magnitude of an angle which is formed between a direction in which said juncture portions extend and an attachment surface part of said outside panel of said body to which said bracket is fixed is 45° or less.

5. A sensor protector according to claim 3, wherein said sheet includes a pair of flat liner-sheets facing each other and a plurality of straight juncture parts each of which joins said liner-sheets together and which extend parallel to one another, and is held by said stay such that, in said sensor attached state, the magnitude of an angle which is formed between a direction in which said juncture portions extend and an attachment surface part of said outside panel of said body to which said bracket is fixed is 45° or less.

6. A sensor protector according to claim 1, wherein
said sheet has a straight crease line portion which extends, in said sensor attached state, in a direction having a component in a direction perpendicular to said attachment surface part of said outside panel of said body to which said bracket is fixed; and
said slit of said sheet holding part has a bent part into which said crease line portion is inserted.

7. A vehicle, comprising:
a sensor protector, a sensor, a bracket, and a bumper cover, wherein
the sensor protector comprises:
a stay provided on the bracket which holds the sensor and is fixed at a predetermined position to an outside panel of a body of the vehicle, said panel being covered with the bumper cover of said vehicle, said stay being non-separable or separable from said bracket; and
a thin-plate shaped sheet which is separable from said stay and is held by said stay;
in a sensor attached state which is a state in which said bracket has been fixed to said outside panel, said sheet extends in a front-back direction and a width direction of said body in an area below a detection surface of said sensor so as to partition a space around said sensor formed between said outside panel of said body and said bumper cover into an upper space which contains the entirety of said detection surface of said sensor and a lower space which does not contain said detection surface of said sensor;
said stay includes a sheet holding part at a position of said stay located below a lower end part of the detection surface of said sensor in said sensor attached state, and said sheet holding part has an elastically deformable claw part and a slit into which said sheet is inserted; and
said sheet has a hole with which said claw part can engage and is configured such that said sheet is held by said stay when said sheet is inserted into said slit and said claw part is engaged with said hole.

8. A vehicle, comprising:
a sensor protector, a sensor, a bracket, and a bumper cover, wherein
the sensor protector comprises:
a stay provided on the bracket which holds the sensor and is fixed at a predetermined position to an outside panel of a body of the vehicle, said panel being covered with the bumper cover of said vehicle, said stay being non-separable or separable from said bracket; and
a thin-plate shaped sheet which is separable from said stay and is held by said stay;
in a sensor attached state which is a state in which said bracket has been fixed to said outside panel, said sheet extends in a front-back direction and a width direction of said body in an area below a detection surface of said sensor so as to partition a space around said sensor formed between said outside panel of said body and said bumper cover into an upper space which contains the entirety of said detection surface of said sensor and a lower space which does not contain said detection surface of said sensor; and
said sheet is formed from a plastic corrugated board, and said sheet has an outline shape which corresponds to a shape of an inner side surface of said bumper cover in plan view in said sensor attached state.

9. A vehicle according to claim 7, wherein said sheet is formed from a plastic corrugated board, and said sheet has an outline shape which corresponds to a shape of an inner side surface of said bumper cover in plan view in said sensor attached state.

10. A vehicle according to claim 8, wherein said sheet includes a pair of flat liner-sheets facing each other and a plurality of straight juncture parts each of which joins said liner-sheets together and which extend parallel to one another, and is held by said stay such that, in said sensor attached state, the magnitude of an angle which is formed between a direction in which said juncture portions extend and an attachment surface part of said outside panel of said body to which said bracket is fixed is 45° or less.

11. A vehicle according to claim 9, wherein said sheet includes a pair of flat liner-sheets facing each other and a plurality of straight juncture parts each of which joins said liner-sheets together and which extend parallel to one another, and is held by said stay such that, in said sensor attached state, the magnitude of an angle which is formed between a direction in which said juncture portions extend and an attachment surface part of said outside panel of said body to which said bracket is fixed is 45° or less.

12. A vehicle according to claim 7, wherein
said sheet has a straight crease line portion which extends, in said sensor attached state, in a direction having a component in a direction perpendicular to said attachment surface part of said outside panel of said body to which said bracket is fixed; and
said slit of said sheet holding part has a bent part into which said crease line portion is inserted.

* * * * *